US011761392B2

United States Patent
Charbonnel

(10) Patent No.: US 11,761,392 B2
(45) Date of Patent: Sep. 19, 2023

(54) METHOD AND SYSTEM FOR ENGINE AIR SYSTEM CONTROL

(71) Applicant: Caterpillar Inc., Peoria, IL (US)

(72) Inventor: Sylvain J. Charbonnel, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 17/322,645

(22) Filed: May 17, 2021

(65) Prior Publication Data

US 2022/0364519 A1 Nov. 17, 2022

(51) Int. Cl.
*F02D 41/00* (2006.01)
*F02D 41/14* (2006.01)

(52) U.S. Cl.
CPC ..... *F02D 41/0007* (2013.01); *F02D 41/0077* (2013.01); *F02D 41/1401* (2013.01); *F02D 41/1448* (2013.01); *F02D 2041/001* (2013.01); *F02D 2041/002* (2013.01); *F02D 2041/1409* (2013.01); *F02D 2041/1412* (2013.01); *F02D 2041/1429* (2013.01); *F02D 2041/1433* (2013.01); *F02D 2200/0406* (2013.01); *F02D 2200/0414* (2013.01); *F02D 2200/0614* (2013.01); *F02D 2200/101* (2013.01); *F02D 2200/703* (2013.01)

(58) Field of Classification Search
CPC ............. F02D 41/0007; F02D 41/0077; F02D 2041/001; F02D 2041/002; F02D 2041/1412; F02D 2041/1433; F02D 2200/04; F02D 2200/0406; F02D 2200/0414
USPC ...................... 701/102; 123/559.2, 561, 564, 123/568.21–568.32
See application file for complete search history.

(56) References Cited

U.S. PATENT DOCUMENTS

| 9,581,080 B2 | 2/2017 | Huang et al. |
| 9,599,053 B2 | 3/2017 | Long et al. |
| 10,190,516 B2 | 1/2019 | Haskara et al. |

(Continued)

FOREIGN PATENT DOCUMENTS

| DE | 102020108243 A1 | 10/2020 |
| EP | 1767760 A2 | 3/2007 |
| EP | 3258089 A1 | 12/2017 |

OTHER PUBLICATIONS

Chen et al. "Nonlinear Estimation and Control of Automotive Drivetrains." Science Press Beijing and Springer-Verlag Berlin Heidelberg, pp. 1-250, 2014.

(Continued)

*Primary Examiner* — Erick R Solis
(74) *Attorney, Agent, or Firm* — Bookoff McAndrews, PLLC

(57) ABSTRACT

In one aspect, a method for controlling an internal combustion engine system including an intake valve, an exhaust gas recirculation (EGR) valve, and a variable-geometry turbocharger (VGT) includes receiving sensor information including information indicative of a condition of air supplied to an internal combustion engine and a condition of exhaust exiting the internal combustion engine. The method also includes receiving a request for an internal combustion engine, projecting a future behavior of the request, and based on the request and the projected future behavior of the request, generating commands for actuating the intake valve, the EGR valve, and the VGT.

19 Claims, 3 Drawing Sheets

(56) References Cited

U.S. PATENT DOCUMENTS

| | | |
|---|---|---|
| 10,190,522 B2 | 1/2019 | Rodgers et al. |
| 10,393,038 B2 | 8/2019 | Wang et al. |
| 2012/0272714 A1* | 11/2012 | Nakada ............... F02D 41/18 73/23.31 |
| 2016/0076473 A1* | 3/2016 | Huang ............... F02M 26/52 701/108 |
| 2016/0146134 A1 | 5/2016 | Wang et al. |
| 2017/0101946 A1* | 4/2017 | Conte ............... F02D 33/02 |
| 2017/0356350 A1 | 12/2017 | Li |
| 2018/0266871 A1* | 9/2018 | Heinken ............ F02D 41/1438 |
| 2018/0328294 A1* | 11/2018 | Levijoki ............ F02D 41/0002 |
| 2019/0085780 A1* | 3/2019 | Liao-McPherson .... F02B 37/24 |
| 2019/0316534 A1 | 10/2019 | Liao-McPherson |

OTHER PUBLICATIONS

Bemporad Alberto: "Model Predictive Control", Jan. 1, 2012 (Jan. 1, 2012), pp. 1-24, XP055955283, Retrieved from the Internet: URL:http://cse.lab.imtlucca.it/~bemporad/teaching/mpc/stuttgart_2012/1-mpc.pdf [retrieved on Aug. 26, 2022].

Written Opinion and International Search Report for Int'l. Patent Appln. No. PCT/US2022/028895, dated Sep. 8, 2022 (12 pgs).

\* cited by examiner

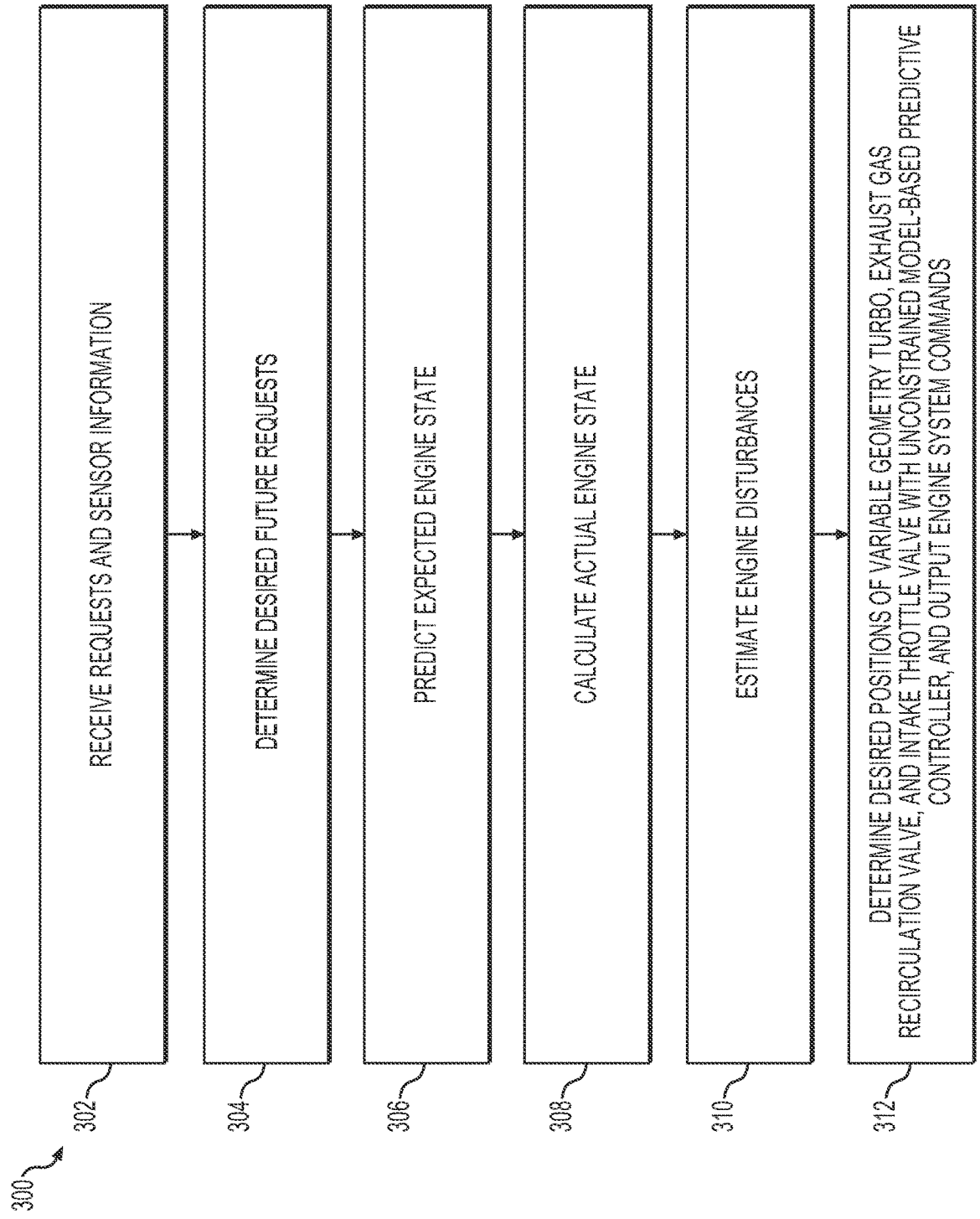

METHOD AND SYSTEM FOR ENGINE AIR SYSTEM CONTROL

TECHNICAL FIELD

The present disclosure relates generally to internal combustion engines, and more particularly, to methods and systems for control of internal combustion engines and intake air and exhaust systems of internal combustion engines.

BACKGROUND

Internal combustion engines are used in vehicles, mobile machines, and stationary machines to perform work or generate power by the combustion of a fuel, such as diesel fuel. Internal combustion engines include multiple systems such as intake air systems, fuel delivery systems, exhaust systems, and others, that are controlled to improve engine efficiency, reduce the quantity of harmful emissions, improve engine response, and otherwise perform in a desired manner. Typically, these systems are controlled with control units that associate a single output with a corresponding input. These so-called "SISO" (single input single output)-based control units are helpful in relatively simple systems, but are less effective for complex systems, especially for systems including actuators that interact with each other, such as components involved with the flow of air and exhaust, such as a variable-geometry turbine, exhaust gas recirculation valve, and intake throttle valve of an internal combustion engine. A change in position of one of these actuators affects the operation of the others, and thus can alter the performance of the system as a whole in an unintended manner. As one example, a change in the position of a variable-geometry turbine can affect intake air pressure, which in turn impacts flow rate of exhaust gas. Thus, a particular position of the variable-geometry turbine can affect the optimal positions of an exhaust gas recirculation valve and an intake throttle valve, making independent control of these components (e.g., by individual control maps) undesirable.

An exemplary model predictive control method is disclosed in U.S. Pat. No. 9,581,080 B2 ("the '080 patent") to Huang et al. The method described in the '080 patent involves a controller that employs rate-based modeling. The rate-based model controller described in the '080 patent calculates a VGT duty cycle and an EGR valve flow rate, and includes a throttle controller that is separate from the rate-based model controller. While the method in the '080 patent may be useful in some circumstances, it may be unable to accurately predict and control engine systems including an intake valve (e.g., an intake throttle valve) that, when actuated, affects engine parameters associated with VGT and EGR components.

The disclosed methods and systems may solve one or more of the problems set forth above and/or other problems in the art. The scope of the current disclosure, however, is defined by the attached claims, and not by the ability to solve any specific problem.

SUMMARY

In one aspect, a method for controlling an internal combustion engine system including an intake valve, an exhaust gas recirculation (EGR) valve, and a variable-geometry turbocharger (VGT) may include receiving sensor information including information indicative of a condition of air supplied to an internal combustion engine and a condition of exhaust exiting the internal combustion engine. The method may also include receiving a request for an internal combustion engine, projecting a future behavior of the request, and based on the request and the projected future behavior of the request, generating commands for actuating the intake valve, the EGR valve, and the VGT.

In another aspect, a method for controlling an internal combustion engine system including an intake valve, an exhaust gas recirculation (EGR) valve, and a variable-geometry turbocharger (VGT) may include receiving sensor information including information indicative of a condition of air supplied to the internal combustion engine and a condition of exhaust exiting the internal combustion engine. The method may also include receiving, by an intake air and exhaust system controller, a request for an internal combustion engine, the request being associated with air supplied to the internal combustion engine and exhaust generated by the internal combustion engine, projecting a future behavior of the internal combustion engine system with a predictive controller, and based on the request and the projected future behavior of the request, generating a command to a secondary controller to actuate at least one of the intake valve, the EGR valve, and the VGT.

In yet another aspect, a control system for an internal combustion engine system may include an intake throttle valve (ITV), an exhaust gas recirculation (EGR) valve, a variable-geometry turbocharger (VGT), and an intake air sensor configured to generate a first signal indicative of a condition of air supplied to an internal combustion engine. The control system may also include an exhaust sensor configured to generate a second signal indicative of a condition of exhaust exiting the internal combustion engine and an intake air and exhaust system controller. The intake air and exhaust system controller may be configured to determine the condition of air supplied to the internal combustion engine and the condition of the exhaust exiting the internal combustion engine based on the first and second signals, receive a request for an output from an internal combustion engine, project a future behavior of the request, and generate commands to actuate the ITV, the EGR valve, and the VGT based on the request and the projected future behavior of the request.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a flowchart of an exemplary process for controlling an internal combustion engine system.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
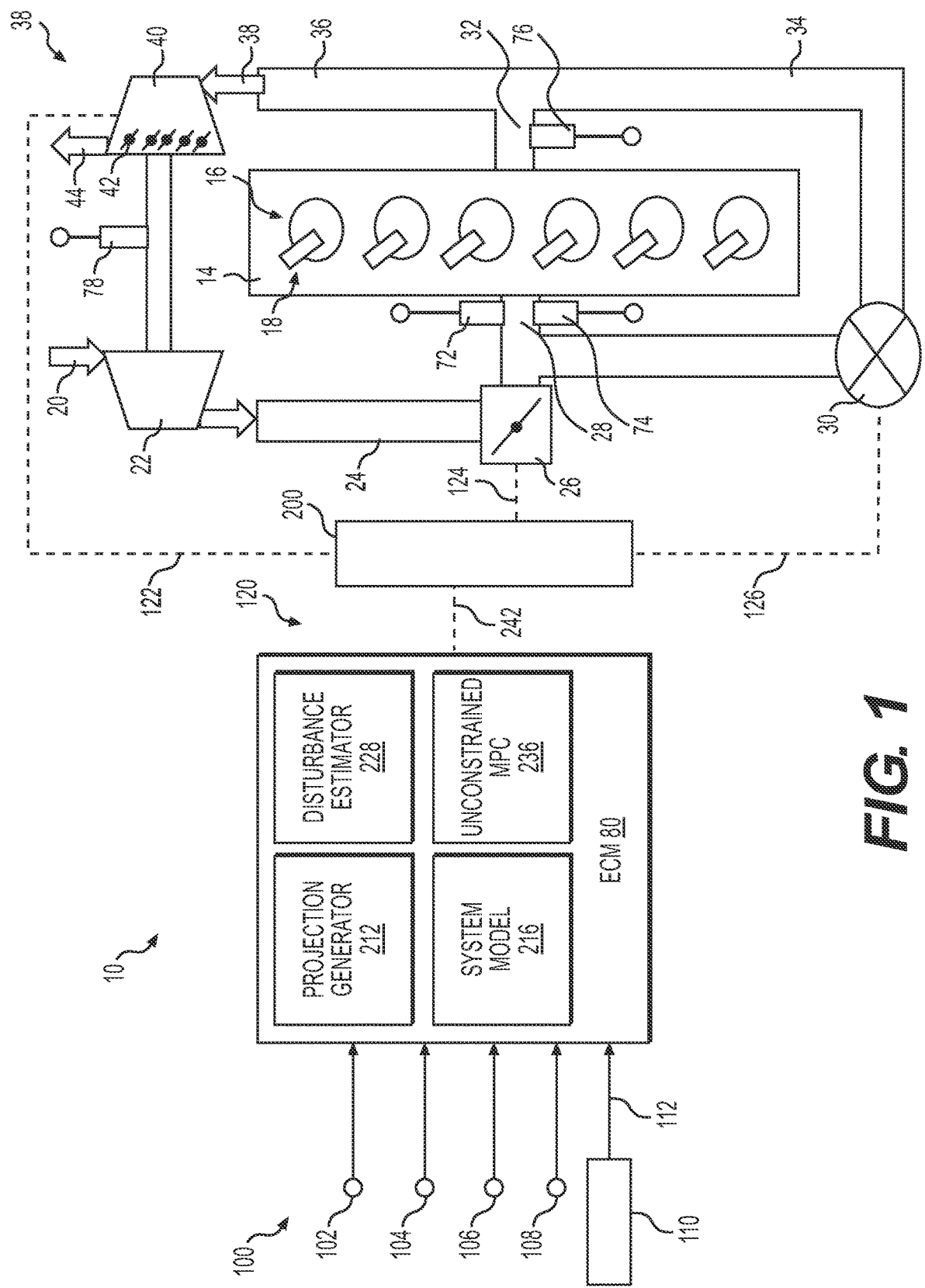
FIG. 1 is a block diagram of an engine intake air and exhaust control system according to aspects of the present disclosure.

FIG. 1 illustrates an exemplary engine intake air and exhaust control system 10 for controlling components of intake air and exhaust systems used with an internal combustion engine 14. Engine intake air and exhaust control system 10 may include an intake air introduction system for supplying intake air to engine 14, an exhaust system for recirculating exhaust and allowing exhaust to exit system 10, and an intake air and exhaust system controller 80, also referred to herein as engine control module (ECM) 80, in communication with a combustion controller 110 (e.g., a higher-level control configured to determine desirable values for controlling combustion in engine 14) and a secondary controller such as actuator controller 200 (e.g., a PID controller configured to generate commands to actuators of system 10). While one actuator controller 200 is shown, as understood, a plurality of actuator controllers 200 may be provided.

Internal combustion engine 14 may include a plurality of cylinders 16 that each receive fuel (e.g., diesel fuel) from a respective fuel injector 18. While engine 14 may be configured to combust diesel fuel, engine 14 may be configured to combust diesel fuel, gasoline, and/or gaseous fuel such as natural gas, either alone or in a dual fuel system that also combusts diesel fuel.

The intake air introduction system of control system 10 that supplies intake air to engine 14 may include an air intake 20 which supplies fresh air to an inlet of a compressor 22 of a variable-geometry turbocharger (VGT) 38. An air passage 24 may extend downstream of compressor 22 to supply compressed air to an intake valve such as intake throttle valve (ITV) 26. An intake manifold 28 may connect ITV 26 to engine 14. While not shown in FIG. 1, intake manifold 28 may branch into individual paths to a plurality of cylinders 16 of internal combustion engine 14.

The exhaust system may include an exhaust manifold 32 having separate branches (not shown) for each cylinder 16 which are connected downstream of engine 14 to receive exhaust gas produced by the combustion of fuel in cylinders 16. An exhaust gas recirculation (EGR) passage 34 may allow a portion of this exhaust to return to intake manifold 28, based on the position of EGR valve 30. An exhaust passage 36 may connect exhaust manifold 32 to an inlet of turbine 40 of VGT 38. Turbine 40 may include a plurality of positionable vanes 42 that control a pressure drop across turbine 40. Vanes 42 may be actuated in response to a control signal to modify a restriction to the flow of exhaust from an inlet of turbine 40 to an outlet of turbine 40. An exhaust passage 44 may be connected downstream of the outlet of turbine 40 to supply exhaust from turbine 40 to one or more aftertreatment devices (e.g., one or more filters and/or catalysts).

A sensor system of control system 10 may include one or more sensors for detecting a condition of air supplied via intake manifold 28, one or more sensors for detecting a condition of exhaust exiting engine 14 via manifold 32, and one or more sensors for detecting a condition of VGT 38. In an exemplary configuration, the sensor system may include an intake manifold pressure sensor 72 configured to detect intake manifold absolute pressure (IMAP) of air within intake manifold 28, and an intake manifold temperature sensor 74 configured to detect intake manifold absolute temperature (IMAT) associated with intake manifold 28. The sensor system may also include an exhaust manifold pressure sensor 76 configured to detect an exhaust manifold absolute pressure (EMAP) within exhaust manifold 32, and a turbine speed sensor 78 may be configured to detect a speed at which turbine 40 rotates (e.g., by detecting rotation of a shaft connected to turbine 40).

ECM 80 may receive inputs 100 and generate outputs 120 to facilitate control of the above-described components of engine air control system 10. ECM 80 may receive an IMAP signal 102 generated by intake manifold pressure sensor 72, an IMAT signal 104 generated by intake manifold temperature sensor 74, an EMAP signal generated by exhaust manifold pressure sensor 76, and a turbine speed signal 108 generated by turbine speed sensor 78. If desired, ECM 80 may receive additional inputs 100 indicative of other aspects of engine 14, including a request 112 from combustion controller 110. Additional inputs 100 may also include a fuel flow rate, an engine speed, a condition of an aftertreatment system, and other appropriate information.

ECM 80 may be configured for model predictive control of engine 14 and may be in communication with additional controllers of system 10 as shown in FIG. 1, or may be a unified controller that directly receives inputs 100 and generates commands 122, 124, and 126 directly to one or more actuated components. ECM 80 may be programmed to implement a projection generator 212, a system model 216, a disturbance estimator 228, and an unconstrained model predictive controller (MPC) 236. ECM 80 may employ these functions to calculate desired positions of VGT 38, ITV 26, and EGR valve 30, for controlling components of system 10. For example, ECM 80 may generate outputs 120, including a command 242 indicative of desired positions of VGT 38, ITV 26, and EGR valve 30, as described below. In turn, actuator controller 200 may generate a VGT command 122 for controlling a position of vanes 42 of VGT 38, an ITV command 124 for controlling a position of ITV 26, and an EGR command 126 for controlling a position of EGR valve 30, via respective actuators. In some configurations, commands 122, 124, and 126 may be generated by ECM 80. Additionally, if desired, ECM 80 may generate additional signals (not shown) for controlling other aspects of system 10 and/or engine 14, such as an amount of fuel delivered to cylinders 16 via fuel injectors 18, a timing of the injection of this fuel, a transmission system, a hydraulic system, etc.

ECM 80 may embody a single microprocessor or multiple microprocessors that receive inputs 100 and generate outputs 120. ECM 80 may include a memory, a secondary storage device, a processor, such as a central processing unit or any other means for accomplishing a task consistent with the present disclosure. The memory or secondary storage device associated with ECM 80 may store data and software to allow ECM 80 to perform its functions. In particular, such data and software in memory or secondary storage device(s) may allow ECM 80 to perform the functions described with respect to FIG. 2 and method 300 described below. Numerous commercially available microprocessors can be configured to perform the functions of ECM 80. Various other known circuits may be associated with ECM 80, including signal-conditioning circuitry, communication circuitry, and other appropriate circuitry. Controllers 110 and 200 may also include one or more microprocessors, memory or secondary storage devices, and appropriate circuitry.

Figure 2:
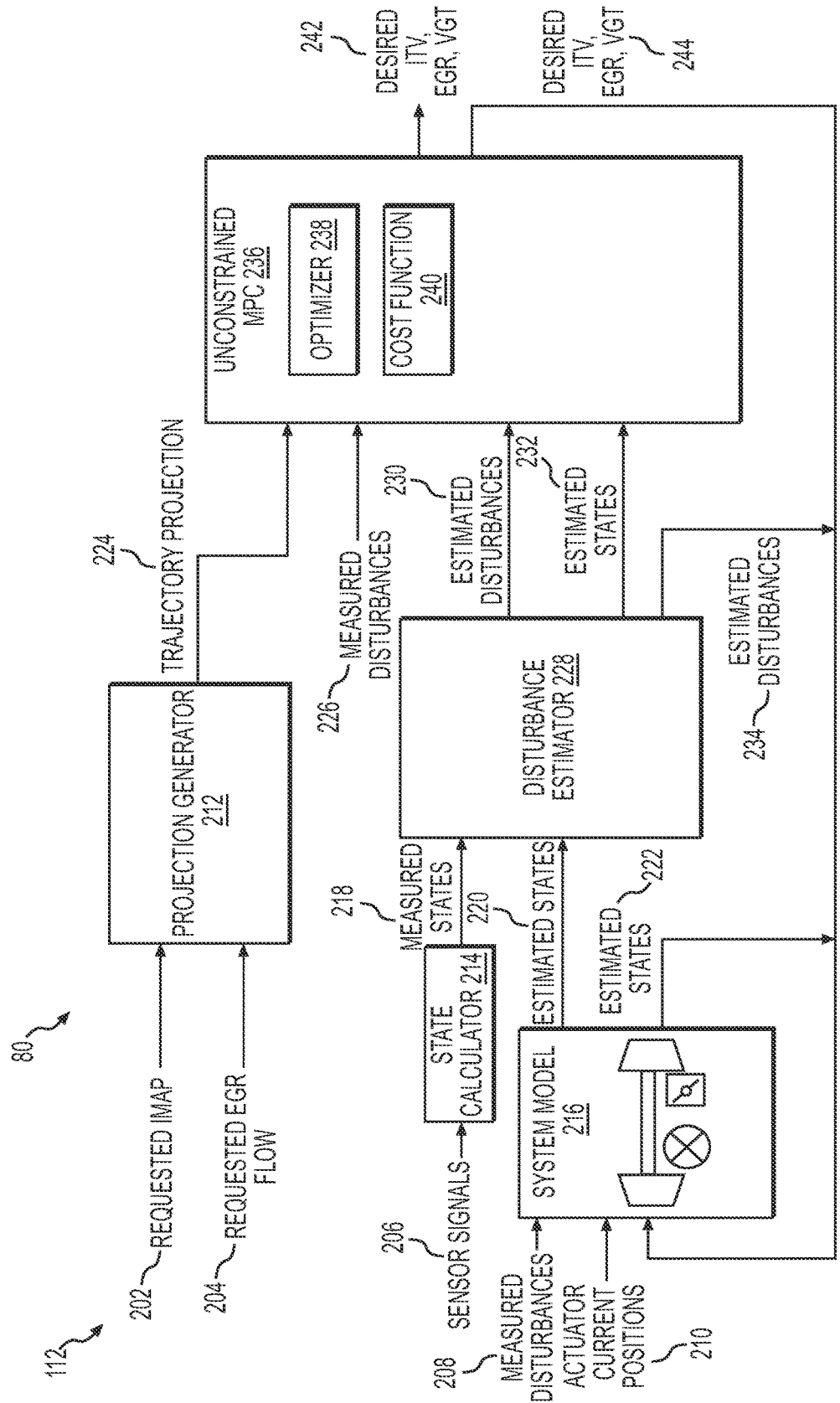
FIG. 2 is a block diagram of an exemplary configuration of an engine control module configured to perform model predictive control for controlling intake air and exhaust systems.

FIG. 2 is a block diagram illustrating an exemplary configuration of ECM 80 that may enable use of an unconstrained MPC 236 to generate desired positions 242 of VGT 38, ITV 26, and EGR 30 (e.g., in the form of a control law). As shown in FIG. 2, components or modules of ECM 80 may include projection generator 212, state calculator 214, a plant or system model 216, a disturbance estimator 228, and an unconstrained MPC 236.

Projection generator 212 may be configured to receive requests from an operator or from a separate controller. These requests may include, for example, a requested IMAP (e.g., a requested pressure of air in intake manifold 28) and a requested EGR flow (e.g., in the form of a desired mass flow rate through EGR passage 34 and EGR valve 30 to return to cylinders 16). Projection generator 212 may generate a trajectory projection 224 as an output. For example, projection generator 212 may be configured to output a matrix indicative of expected future values of requests 202 and 204 over a predetermined period of time or projection window. This projection window may correspond to a number of future steps which may represent points in time in the future.

Future values of requests 202 and 204 included in trajectory projection 224 may be determined based on the current values of these requests and, if desired, one or more previous values. In one example, the future values, or trajectory, of requests 202 and 204 may be projected to have a constant or flat trajectory, and thus are based on current values. In other examples, the trajectory projection 224 may assume that the error between final desired values of requests 202 and 204 and a target a given point in the projection window or projection horizon decays exponentially. In another example, future values of requests 202 and 204 may be selected from a range of values that approach a predetermined value (e.g., a funnel-based approach). Regardless of the particular approach, projection generator 212 may convert singular requests 202 and 204 into trajectory projection 224, which is indicative of a future behavior of requests 202 and 204 (e.g., one or more future values of requests 202 and 204) over a predetermined period of time that represents the length of the projection window.

State calculator 214 may be configured to receive sensor signals 206 that correspond to, for example, signals 102, 104, 106 and 108 (FIG. 1), and convert these sensor signals 206 to estimated conditions of components of system 10. State calculator 214 may be configured to calculate measured states 218 of system 10 that include, IMAP, EMAP, turbo speed, trapped mass (e.g., a mass of trapped air within one or more air intake components or cylinders 16 of engine 14, calculated based on the measured value of IMAT indicated by intake manifold temperature signal 104), flow rate of intake air through compressor 22, and flow rate of exhaust through EGR valve 30. IMAP may be determined based on intake manifold pressure signal 102. EMAP may be determined based on exhaust manifold pressure signal 106, while turbo speed may be determined based on turbo speed signal 108.

System model 216 may receive, as inputs, measured disturbances 208 and current actuator positions 210 (e.g., current positions of VGT 40, ITV 26, and EGR valve 30 in vector form). Measured disturbances 208 may include measured and/or calculated values that correspond to external disturbances that affect performance of the intake air and exhaust systems of system 10. For example, measured disturbances 208 may include engine speed detected by an engine speed sensor, an amount of fuel supplied by fuel injectors 18, a torque generated by engine 14, detected temperatures (e.g., ambient temperature, coolant temperature, etc.), and ambient air pressure (e.g., a barometric pressure). System model 216 may also receive, as feedback, estimated states 222 output from system model 216 (e.g., the result of the previous calculation by system model 216), estimated disturbances 234 output from disturbance estimator 228 (e.g., the result of the previous calculation by disturbance estimator 228), and desired ITV, EGR, and VGT positions 244 as described below.

System model 216 may include a model of the intake air and exhaust systems associated with engine 14. System model 216 may include mathematical relationships for air intake 20, compressor 22, EGR components (EGR valve 30 and EGR passage 34), cylinders 16, exhaust manifold 32, turbine 40, and vanes 42, for example. System model 216 may model the interactions between these components, and may be configured to predict the overall effect of the positions of vanes 42 of VGT 38, ITV 26, and EGR valve 30 on the resulting IMAP, EGR flow, and other performance characteristics. The model stored in system model 216 may be a linear or non-linear model stored in a memory of ECM 80 and may be accessed by other modules of ECM 80.

Disturbance estimator 228 may receive measured states 218 from state calculator 214 (e.g., actual or measured values of IMAP, EMAP, turbo speed, trapped mass, flow rate of air through compressor 22, and flow rate of exhaust through EGR valve 30) and estimated states 220 from system model 216 (e.g., values, estimated with system model 216, of IMAP, EMAP, turbo speed, trapped mass, flow rate of air through compressor 22, and flow rate of exhaust through EGR valve 30). Thus, estimated states 220 may include expected values that correspond to the values of measured states 218. Disturbance estimator 228 may compare measured states 218 and estimated states 220 to determine an amount of deviation between the two. This comparison may be performed with a Kalman filtering technique (linear, extended, or unscented), for example. Based on the deviation between measured states 218 and estimated states 220, disturbance estimator 228 may be configured to calculate estimated disturbances 230. Estimated disturbances 230 may be an estimation of internal disturbances that are not directly measured and which represent, for example, physical realities that are not reflected in system model 216. Estimated disturbances 230 may be output with estimated states 232 to unconstrained MPC 236. These estimated internal disturbances may also be output as estimated disturbances 234 and used to correct system model 216. While disturbance estimator 228 may be configured to estimate internal disturbances that are not directly measured, a "disturbance" may also include an external disturbance measured via one or more sensors or otherwise calculated by ECM 80, as described below with respect to measured disturbances 226.

Unconstrained MPC 236 may be a linear or non-linear model predictive controller including an optimizer 238 configured to identify an optimal set of control points (e.g., as a control law) based on a performance index or cost function 240. In particular, unconstrained MPC 236 may be programmed to evaluate potential sets of candidate control points corresponding to positions of ITV 26, EGR valve 30, and VGT 38, and output, for example, desired ITV, EGR, VGT positions 242.

In an exemplary configuration, unconstrained MPC 236 is a model predictive controller that performs an optimization routine based on a linearized version of system model 216. Linearization of system model 216 (e.g., by a perturbation technique) may facilitate approximation of the behavior modeled by system model 216 and may be performed periodically (e.g., each time desired ITV, EGR, VGT positions 242 are output to actuator controller 200). This linearization may reduce the complexity of the optimizer's calculations, as described below, and therefore enables optimizer 238 to converge faster to an optimum control law within a particular period of time when compared to a non-linear MPC.

Unconstrained MPC 236 may receive, as inputs, information generated by projection generator 212 and disturbance estimator 228, including trajectory projection 224 indicative of one or more future values of requests 202 and 204, estimated disturbances 230, and estimated states 232. Unconstrained MPC 236 may also receive measured disturbances 226. Measured disturbances 226 may include measured and/or calculated values that correspond to external disturbances that affect performance of the intake air and exhaust systems of system 10, and may be the same values as measured disturbances 208 received by system model 216.

Optimizer 238 may evaluate sets of candidate control points based on cost information stored with cost function 240 and select the set of candidate control points associated with the lowest cost. For example, optimizer 238 may determine performance values that correspond to each set of candidate control points. Performance values may represent the expected performance of components of system 10 for a particular set of candidate control points. Each performance value may be calculated over an entirety of the projection window, enabling the determination of costs across the entire projection window. For example, one performance value may include expected IMAP values calculated over the projection window for a set of candidate control points.

In particular, exemplary performance values may include expected values of IMAP, EMAP, turbo speed, trapped mass, flow rate of air through compressor 22, flow rate of exhaust through EGR valve 30, and others. The deviation of these values from respective desired values may be programmed as a trajectory error or tracking error of cost function 240. Performance values may also include an expected amount of change in positions VGT 38, EGR valve 30, and ITV 26 from current positions of these actuators, which may correspond to an actuator movement cost of cost function 240. In some configurations, cost function 240 may associate a higher cost with large changes in the positions of these actuators. Additional costs of cost function 240 may include soft constraints (e.g., a desired range that, once deviated from, incurs a cost of cost function 240). Soft constraints may associate higher costs with relatively extreme positions or high values (e.g., high temperatures, highly-restrictive positions of VGT 38 and ITV 26, etc.). Each cost may be calculated over an entirety of the projection window, such that the costs represent the total cost incurred across the projection window, as indicated above. Additionally, ending or terminal positions of VGT 38, EGR valve 30, and ITV 26 at the end of the projection window may also be included in the performance values, and may be associated with costs of cost function 240.

In some configurations, cost function 240 of unconstrained MPC 236 may be programmed with a plurality of soft constraints so that unconstrained MPC 236 is free to select among sets of candidate control points for controlling VGT 38, EGR valve 30, and ITV 26 without considering any hard constraints. As used herein, an "unconstrained" model predictive controller employs one or more soft constraints, but does not use hard constraints. As used herein a "soft constraint" corresponds to one or more performance values that are associated with a cost, but which are permitted for selection. In contrast, a set of candidate control points associated with a hard constraint are not permitted for selection under any circumstances. The use of soft constraints may ensure that optimizer 238 is able to identify an optimal set of candidate control points for each calculation cycle of ECM 80, as described below. Thus, soft constraints employed by an unconstrained MPC may be suitable for controlling the positions of components that interact with each other, such as VGT 38, EGR valve 30, and ITV 26, and may avoid complex analyses which can result in selection of a sub-optimal set of candidate control points to avoid a particular hard constraint.

Optimizer 238 may conduct a search for appropriate sets of candidate control points, and may be programmed with one or more search strategies, as algorithms, to facilitate the identification of suitable sets of candidate control points having a minimal cost. In some embodiments, the search strategy may be targeted, based on one or more previously-identified sets of candidate control points, such as the most favorable set of candidate control points identified by optimizer 238. Optimizer 238 may be configured to perform a random or semi-random search (e.g., via a Latin Hyper Cube algorithm, Particle Swarm technique, or similar techniques) in order to identify candidate control points that would not likely be identified by performing a targeted search. Suitable targeted search strategies may be based on matrix inversion, gradient search (e.g., conjugate gradient, steepest descent, Broyden-Fletcher-Goldfarb-Shanno (BFGS), or first rank), dynamic differential programming, or a hybrid technique (e.g., a random or semi-random search followed by a gradient search). In some aspects, optimizer 238 may be configured to perform a plurality of search strategies in parallel. Search strategies that may be performed in parallel may include a random search, a grid-based search, matrix inversion searching, or others. The results of the parallel searches may be compared such that the most optimal set of candidate control points is selected from among the different searches.

INDUSTRIAL APPLICABILITY

The disclosed aspects of engine intake air control system 10 may be employed in a variety of engines, and machines and/or vehicles that incorporate these engines to generate power to move the machine, power an implement, generate electrical energy, etc. Control system 10 may be included in any machine having an internal combustion engine that includes intake air and exhaust systems, and in particular, an intake air and exhaust system including an ITV, an EGR valve, and a VGT.

During the operation of engine intake air and exhaust control system 10, engine 14 combusts fuel injected by fuel injectors 18 to cylinders 16. ECM 80 may receive requests 112, including desired intake airflow and exhaust commands, from a combustion controller 110, and may generate signals 242 indicative of desired ITV, EGR, and VGT positions to one or more actuator controllers 200 for actuation of ITV 26, EGR valve 30, and VGT 38. Signals 242 of desired ITV, EGR, and VGT positions may be generated with a linear unconstrained MPC that is configured to predict requests from combustion controller 110 over a projection window based on current and previous requests 112, to evaluate the desirability of various sets of candidate control points for the intake air and exhaust components connected to engine 14.

FIG. 3 is a flowchart illustrating an exemplary method 300 for controlling an internal combustion engine system, such as engine intake air and exhaust control system 10, including a VGT 38, ITV 26, and EGR valve 30. Method 300 may include a step 302 for receiving requests and sensor information for operation of engine 14. Requests received in step 302 may include a request 112 generated from a higher-level controller, such as combustion controller 110, in communication with ECM 80, as described above. In particular, requests 112 may include a requested IMAP 202 and a requested EGR flow 204. The received sensor information in step 302 may be from the sensor system associated with system 10, including signals 102, 104, 106, and 108. Step 302 may include receiving or calculating additional requests or sensor information for engine 14, including engine speed, quantity or mass of injected fuel, temperatures of system 10, and others.

Step 304 may include determining one or more desired future requests. These future requests may correspond to future values of the requests 112 received in step 302. For example, ECM 80 may determine a projection for requests 202 and 204, as described above with respect to projection generator 212. This projection may include constant values, values that approach a particular setpoint (e.g., via an exponential decay function or a funnel-based algorithm), or values that fluctuate over time. The projection may be based on current values of requests 202 and 204, as well as historical values of these requests.

A step 306 may include predicting an expected engine state with system model 216. This state may correspond to a current status of engine 14 and the intake air and exhaust systems for engine 14, which are output from system model 216 as estimated states 220. The predicted engine states, output as estimated states 220, may correspond to conditions simulated with system model 216 based on current actuator positions 210 (e.g., positions of VGT 38, ITV 26, EGR 30) and measured disturbances 208 such as engine speed, an amount of injected fuel, engine torque, ambient temperature, coolant temperature, or ambient air pressure. Exemplary estimated engine states 220 may include values of IMAP, EMAP, turbo speed, and trapped air mass.

A step 308 may include calculating an actual engine state with state calculator 214. This actual engine state may be calculated based on sensor signals 206 and output as measured states 218. The actual engine state or measured states 218 may represent actual states of IMAP, EMAP, turbo speed, trapped air mass, flow rate of air through compressor 22, and flow rate of exhaust through EGR valve 30.

The predicted and calculated engine states of steps 306 and 308 may be compared to each other and tracked. The differences between these states 218 and 220 may be evaluated with a Kalman filter of disturbance estimator 228. For example, in step 310, engine disturbances (e.g., estimated disturbances 230) may be estimated with a Kalman filter based on model output predictions and current measurements from the above-described sensors of system 10. These disturbances 230 may include, for example, internal disturbances such as uncertainties in model 216 or dynamics of system 10 that are not represented in model 216. These estimated internal disturbances may also be output as estimated disturbances 234 for use in correcting system model 216.

Step 312 may include determining desired positions of VGT 38, EGR 30, and ITV 26 with use of an unconstrained MPC 236. This may be performed by identifying an optimal set of candidate control points with optimizer 238. The optimal set of candidate control points may be determined by using cost function 240 to evaluate costs associated with each set of candidate control points over an entirety of the projection window. In one example, a set of candidate control points may be calculated by performing the steps of method 300, including step 312, about every 10 ms. To ensure sufficient accuracy in the evaluation of sets of candidate control points according to cost function 240, each projection window may extend for a desired number of steps (e.g., 1 step, 5 steps, 10 steps, 20 steps, 50 steps, etc.), and may cover 1000 ms or other suitable periods of time, based on the requirements of system 10.

Step 312 may be performed with a cost function 240 that includes a plurality of soft constraints, to ensure an optimal set of control points is identified. By using an unconstrained MPC 236 it may be possible to ensure that an optimization algorithm (e.g., optimizer 238) is configured to consistently identify an optimal set of control points. Step 312 may further include evaluating costs (e.g., in cost function 240) that are correlated with terminal positions of VGT 38, EGR valve 30, and ITV 26, as well as the evaluation of costs associated with changing the positions of VGT 38, EGR valve 30, and ITV 26, to facilitate selection of desired positions 242 that are the most optimal control points for operating engine 14. Step 312 may also include outputting desired positions 242 as one or more signals for controlling VGT 38, EGR valve 30, and ITV 26. This may be performed by outputting positions 242 as a signal to one or more actuator controllers 200 (e.g., a PID controller). Alternatively, signals 242 may be output directly to one or more actuators by ECM 80.

The system and method of the present disclosure may facilitate control of an engine system including air and exhaust components that interact with each other, such as an intake throttle valve, variable-geometry turbocharger, and exhaust gas recirculation valve. The disclosed system and method may facilitate a reduction in an amount of engine testing required during initial programming for calibration of an engine controller. Optimal control of intake air and exhaust systems by modeling an intake throttle valve, variable-geometry turbocharger, and exhaust gas recirculation valve may improve fuel consumption of engine 14, while also allowing for an increase in power density as the system may, in some circumstances operate closer to system limits. A model-based control system for intake air and exhaust systems may avoid the need to incorporate logic to switch between different modes, or the need to prepare specialized programming for use in specific situations. For example, the disclosed system and method may allow for coordinated control of an intake throttle valve, variable-geometry turbocharger, and exhaust gas recirculation valve, by taking into account the interactions between these components over time. Additionally, model-based control systems described herein may allow for an output (e.g., an optimal set of control points) to be identified for each step of controlling an engine, while avoiding the identification of only unfeasible sets control points, thereby increasing robustness of the control system.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method for controlling an internal combustion engine system including an intake valve, an exhaust gas recirculation (EGR) valve, and a variable-geometry turbocharger (VGT), the method comprising:
receiving sensor information including information indicative of a condition of air supplied to an internal combustion engine with an intake manifold and a condition of exhaust exiting the internal combustion engine;
receiving a request for an internal combustion engine associated with the intake manifold;
projecting a future behavior of the request associated with the intake manifold; and
based on the request associated with the intake manifold and the projected future behavior of the request, generating commands for actuating the intake valve, the EGR valve, and the VGT with an unconstrained model predictive controller that employs one or more soft constraints, but does not use hard constraints.

2. The method of claim 1, wherein the commands to actuate the intake valve, the EGR valve, and the VGT are generated based on an output of the unconstrained model predictive controller.

3. The method of claim 2, wherein the unconstrained model predictive controller generates commands to actuate each of the intake valve, the EGR valve, and the VGT.

4. The method of claim 2, wherein the unconstrained model predictive controller is configured to evaluate sets of candidate control points for actuating the intake valve, the EGR valve, and the VGT.

5. The method of claim 4, wherein the unconstrained model predictive controller is configured to select a set of candidate control points based on the one or more soft constraints used to rank the sets of candidate control points.

6. The method of claim 1, further including estimating a disturbance based on the received sensor information.

7. The method of claim 1, wherein the request for the internal combustion engine is received from an engine combustion controller in communication with the unconstrained model predictive controller.

8. The method of claim 1, wherein the received sensor information includes rotation speed of the VGT, intake manifold pressure, intake manifold temperature, and exhaust manifold pressure.

9. A method for controlling an internal combustion engine system including an intake valve, an exhaust gas recirculation (EGR) valve, and a variable-geometry turbocharger (VGT), the method comprising:
receiving sensor information including information indicative of a condition of air supplied to the internal combustion engine and a condition of exhaust exiting the internal combustion engine;
receiving, by an intake air and exhaust system controller, a request for an internal combustion engine, the request being associated with air supplied to the internal combustion engine and exhaust generated by the internal combustion engine;
projecting a future behavior of the internal combustion engine system with a predictive controller;
estimating a disturbance of the internal combustion engine system that is not directly measured with a sensor of the internal combustion engine system, the estimated disturbance representing a difference between a measured state and a modeled state; and
based on the request, the estimated disturbance, and the projected future behavior of the internal combustion engine system, generating a command to a secondary controller to actuate at least one of the intake valve, the EGR valve, and the VGT.

10. The method of claim 9, wherein the request for the internal combustion engine is received from a higher-level controller.

11. The method of claim 9, wherein the secondary controller is a PID controller.

12. The method of claim 9, wherein the predictive controller is an unconstrained model predictive controller that generates the command based on a linearized model of the internal combustion engine system.

13. The method of claim 9, further including measuring a disturbance of the internal combustion engine system that causes the projected future behavior of the internal combustion engine system to deviate from an actual behavior of the internal combustion engine system.

14. A control system for an internal combustion engine system, comprising:
an intake throttle valve (ITV);
an exhaust gas recirculation (EGR) valve;
a variable-geometry turbocharger (VGT);
an intake air sensor configured to generate a first signal indicative of a condition of air supplied to an internal combustion engine;
an exhaust sensor configured to generate a second signal indicative of a condition of exhaust exiting the internal combustion engine; and
an intake air and exhaust system controller configured to:
determine the condition of air supplied to the internal combustion engine and the condition of the exhaust exiting the internal combustion engine based on the first and second signals,
receive a request for an output from an internal combustion engine,
project a future behavior of the request, and
generate commands to actuate the 1W, the EGR valve, and the VGT based on the request and the projected future behavior of the request,
wherein the intake air and exhaust system controller is an unconstrained model predictive controller that employs one or more soft constraints, but does not use hard constraints.

15. The system of claim 14, further comprising a higher-level controller in communication with the air and exhaust system controller.

16. The system of claim 14, wherein the unconstrained model predictive controller is configured to evaluate sets of candidate control points for actuating the intake valve, the EGR valve, and the VGT.

17. The system of claim 14, wherein the intake air and exhaust system controller is configured to project a future behavior of the internal combustion engine system based on one or more measured disturbances.

18. The system of claim 17, wherein the one or more measured disturbances includes an engine speed, an amount of fuel injected by one or more fuel injectors, a detected temperature, or an ambient air pressure.

19. The method of claim 1, wherein the request associated with the intake manifold is generated with a controller in communication with the unconstrained model predictive controller, the unconstrained model predictive controller being configured to project a future behavior of a plurality of requests, including the request associated with the intake manifold.

* * * * *